Feb. 1, 1938. J. M. DANNHEISER 2,106,968
EMERGENCY POWER SUPPLY SYSTEM
Filed April 27, 1936
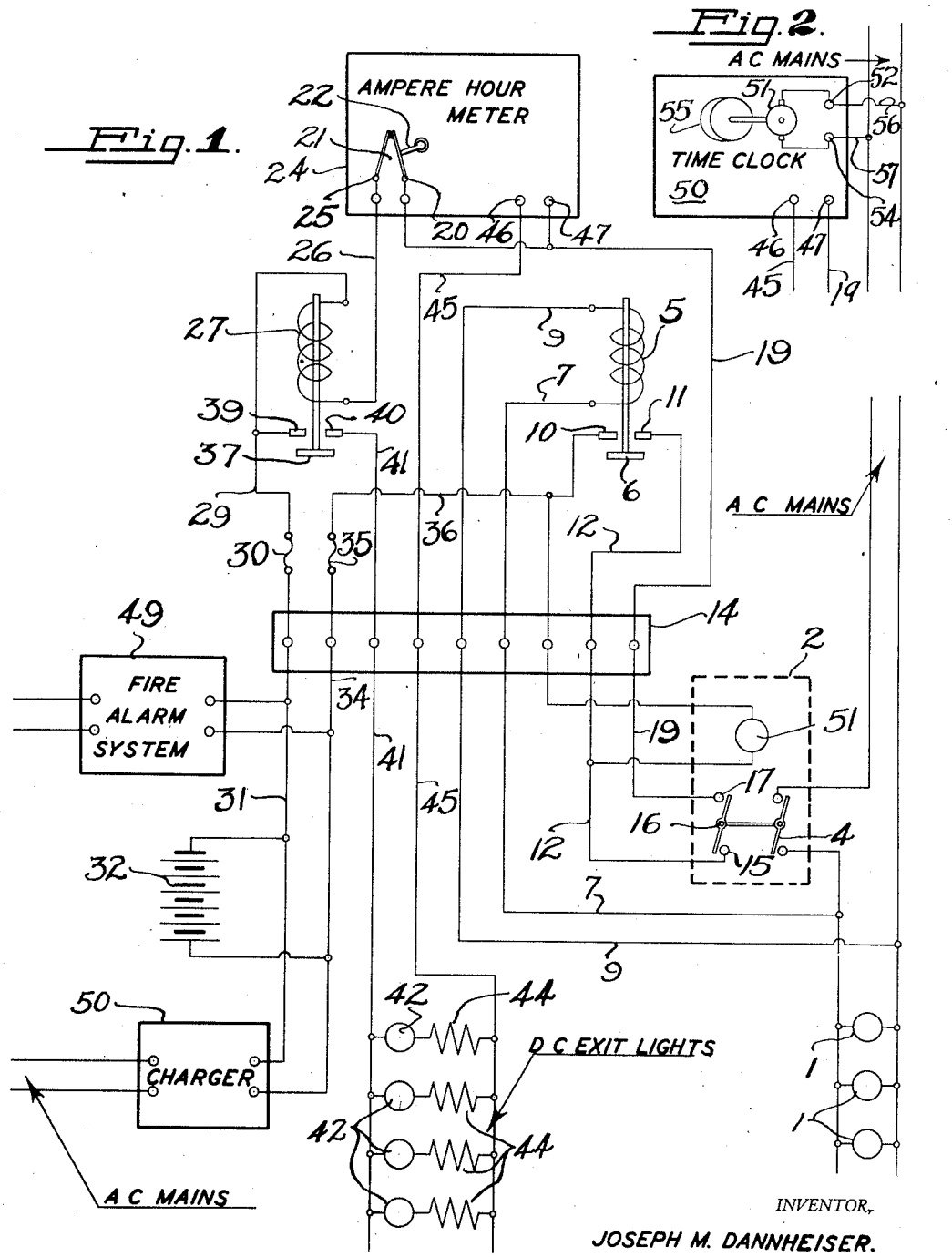
INVENTOR,
JOSEPH M. DANNHEISER.
BY
Lippincott & Metcalf
ATTORNEYS.

Patented Feb. 1, 1938

2,106,968

UNITED STATES PATENT OFFICE 2,106,968

EMERGENCY POWER SUPPLY SYSTEM

Joseph M. Dannheiser, San Francisco, Calif.

Application April 27, 1936, Serial No. 76,591

10 Claims. (Cl. 171—97)

My invention relates to emergency power supply systems, and more particularly to switching arrangements for supplying emergency lighting current for a specified period of time.

Among the objects of my invention are: To provide a switching system through which emergency lighting current for exit lights for theatres or other places of public assembly may be supplied; to provide a common battery system for fire alarm and emergency exit light use; to provide a battery supply for emergency exit lighting wherein the battery is automatically kept charged beyond certain minimum requirements; to provide means for emergency lighting of exits for a definite, predetermined, length of time; to provide a method of emergency lighting for exits from existing battery installations requiring a certain minimum charge; to provide a method of avoiding duplication of battery facilities necessary to operate fire alarm and emergency exit lights; to provide an emergency exit lighting system so inexpensive that it may be installed in locations where it would otherwise not be economically feasible to utilize such precautionary measures; to provide a standby circuit arrangement which may be simply constructed of easily procurable materials; and to provide a common battery power supply for a multiplicity of loads, which supply shall be automatically maintained at full efficiency.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Figure 1 is a schematic circuit diagram of my invention applied to the emergency lighting of exits in places of public assembly.

Figure 2 is a partial connection diagram showing alternative apparatus for breaking the circuit after a certain interval of time.

Briefly as to apparatus, my invention comprises a relaying system actuated by current failure in the normal exit light current supply mains to connect a source of emergency current to emergency exit lights, a timing device adapted to disconnect the emergency lighting circuit after a fixed interval, and a charging device adapted to maintain the emergency power supply at full charge.

The need for illuminating the exits of structures used for the assembly of considerable numbers of people is so well known that it has been reflected in building ordinances throughout the country. It is essential, if complete provision for safety be made, that an auxiliary lighting current source be made available for exit lights in the event of a failure of the main current supply.

A reliable source of such auxiliary current is the storage battery, but the installation cost of a battery giving the potentials commonly used for alternating current lighting is very high. It is therefore desirable to equip the auxiliary circuit with low voltage lamps, and to use a few storage cells of substantial ampere-hour capacity.

Since the drain on these batteries is intermittent in character, deterioration from idleness is to be expected more than from use. I therefore find it advantageous to connect additional load to the batteries, and since they must be always ready for service, to provide charging means which will function automatically whenever the battery potential drops below a certain value. These means may be of any conventional type, operable at a high charging rate for a short time, or at a low value for a longer period, as in "trickle" chargers.

A considerable saving may be made in initial cost by using a single battery system for both purposes, and the deterioration, due to idleness, eliminated by such a combination.

Still more important, such a functional union is so economical that these safety measures may be installed in structures from which they might be otherwise omitted for reasons of economy, and the safety of the public thereby increased.

Fire alarm equipment is particularly suited to combination with my emergency lighting system, since it commonly utilizes a low voltage supply battery in closed circuit, providing a steady current drain.

It is necessary for the proper functioning of the fire alarm system, that the battery voltage be kept above a certain minimum value. Consequently, the charging equipment must function when the battery capacity drops below a value sufficient to operate the lighting system for a predetermined period of time and still retain sufficient charge to cover the minimum needs of the alarm system.

It has been customary to so design emergency circuits that the load remained connected until exhaustion of the batteries or until the main supply was restored.

Experience has shown that this is not necessary, however, and under the rules adopted by the Fire Underwriter's Association, a period of one half hour is regarded as offering time for the complete evacuation of a structure in emergency, with an ample margin of safety.

I therefore desire to provide a timing device which will open the emergency lighting circuit after such a period of time, which may be lengthened or shortened as desired to meet particular conditions. This permits the evacuation of the structure, maintains the fire alarm system in readiness, and prevents exhaustion of the battery.

Other loads, such as burglar alarm systems, may be added to the battery if desired, limited only by the requirement that a certain minimum charge necessary to operate the fire alarm be always available.

The more detailed operation of my device may be understood from a direct reference to the drawing.

The exits of the building to which my invention is applied are normally illuminated by lights 1, fed through a master switch 2 having a switch arm 4 with appropriate contacts, from the alternating current mains.

An alternating current relay 5, having a movable contact element 6, is connected in parallel with lamps 1 through leads 7 and 9. Contacts 10 and 11 are so positioned with respect to movable contact 6 that there is no connection between them as long as current is flowing in the circuit of lamps 1. When current ceases to flow through lamps 1, either through failure of the alternating current supply from the mains or from opening the master switch 2, relay 5 is de-energized, and the movable contact element 6 makes connection between contacts 10 and 11.

Contact 11 is connected through lead 12 and terminal board 14 to one contact 15 of an auxiliary make-and-break switch 16, mechanically linked with switch arm 4 of master switch 2. The opposite contact 17 of switch 16 is connected through lead 19 and terminal board 14 to one element 20 of a make-and-break switch 21, normally closed, actuated by a control arm 22 mechanically linked with an ampere-hour meter 24, indicated schematically. The cooperating switch element 25 is connected through lead 26 to a relay 27, in turn connected through a lead 29 to a fuse 30, and terminal board 14, from which lead 31 connects with the positive side of battery 32. Relay 27 is designed to operate only when a current greater than that required for the operation of a pilot lamp 51, to be described later, is passed through its windings.

Lead 34 connects the negative side of battery 32 through the terminal board 14 to a fuse 35, and thence through a lead 36 to the contact 10 of relay 5. Fuses 30 and 35 protect the system from overload currents.

If the master switch 2 is open, relay 5 is deenergized and connection is made by movable contact element 6 between contacts 10 and 11, but still no current flows from battery 32 through relay 27 because the circuit is broken at switch 16.

When the master switch 2 is closed, and failure occurs in the supply from the alternating current mains to lights 1, the closing of the circuit through contacts 10 and 11 by the de-energization of relay 5 results in energizing relay 27, causing movable contact member 37 to make connection between contacts 39 and 40.

Contact 39 is connected to lead 29, and through lead 29, fuse 30, terminal board 14 and lead 31 to the positive side of battery 32. Contact 40 is connected through lead 41 and terminal board 14 to low voltage lamps 42, from which a return circuit to battery 32 is provided through resistors 44 and lead 45 to the terminal board 14 and terminal 46 of the ampere-hour meter 24. Terminal 47 of meter 24 is connected to battery 32 through lead 19, switch 16 and the contacting elements 11, 6 and 10 of relay 5.

Consequently, when a failure of the alternating current supply occurs, relay 5 causes relay 27 to close the battery circuit through lamps 42, providing emergency exit illumination.

The ampere-hour meter 24 is so constructed that when the amount of current used in the lamp circuit during one half hour has passed through it, control arm 22 is actuated to release the make-and-break switch 21, and turn off the lights 42, leaving enough charge in the battery to more than supply the demands of the fire alarm system 49, shown schematically. This system is connected across battery 32 through leads 31 and 34.

When the charge upon battery 32 has become less than the value necessary for the stand-by requirements of the circuit, charger 50, also connected across battery 32 through leads 31 and 34, is automatically cut into operation, recharging the battery as long as necessary, when it is again cut out automatically. Such arrangements are well known and need no further exposition.

A pilot lamp 51, preferably mounted with the master switch 2, is provided to indicate to the operator who turns on switch 2, that the switch 21 is closed, the battery 32 functioning, and that the main supply is connected. Lamp 51 draws current from battery 32 through relay 27, but the resistance of the lamp is sufficient to limit that current to a value below that to which relay 27 will respond.

If there has been a main line failure prior to turning on the switch 2, the pilot lamp 51 will not light, since relay 5 will not be energized, and contact 6 will short out the pilot lamp through contacts 10 and 11. This connection will cause relay 27 to function, and the emergency exit lights will operate for the predetermined period of time. Upon resumption of the main supply, the switch 21 may be manually reset.

Instead of the ampere-hour meter 24 described, a time clock may be used, adjusted to open switch 21 in a certain interval of time after the emergency circuit has begun to function. Such an alternative arrangement is indicated schematically in Figure 2, which shows only those external connections differing from the ampere-hour meter of Figure 1. The connections and parts not shown are identical with the circuit of that figure.

The time clock unit 50 contains a self-starting, synchronous motor having its leads brought out to terminals 52 and 54, and a mechanical clock unit 55 having its spring winding mechanism connected to the motor 51, and having connection to a switch opening arrangement, not shown, identical with elements 20–25 inclusive of Figure 1. Motor 51 and clock 55 are of conventional design, and their details are hence omitted.

Leads 56 and 57 are provided to connect terminals 52 and 54 to the alternating current mains. Current flow in the mains causes the synchronous motor to maintain the clockwork tightly wound, ready to begin operation upon failure of current in the mains.

It should be noted that in this embodiment, the current flowing through terminals 46 and 47 will serve merely to actuate the clock mechanism through a magnetic trip or similar device, not shown, causing the clock to measure off the desired period of time before opening switch 21, and the amount of current flowing through terminals 46 and 47 will not control the length of time before switch 21 opens, as was the case with the watt-hour meter arrangement previously described.

The detailed arrangement of the trip and other mechanical parts will be subject to variations within the skill of a competent workman, and any arrangement corresponding to that described acting to open the circuit after a predetermined interval is deemed to be a full equivalent within the scope of the claims.

The advantage obtained by using the synchronous motor combination with the spring clock work is that the circuit will not be reset for operation until the main supply has been restored, the exhaustion of the battery is prevented, and manual resetting of switch 21 is made unnecessary.

My invention has been designed to operate with a fire alarm system requiring a twenty-four volt potential and to utilize twelve volt bulbs in the emergency lighting circuit. For this reason I have made use of a battery (32) potential of twenty-four volts, and have provided resistors 44 to reduce the potential across lamps 42 to twelve volts.

It is obvious that with the battery potential provided, resistors 44 may be eliminated if desired. Half of lights 42 may be connected across each twelve volt section of battery 32, or a midpoint connection may be provided for the return lead 34.

Any type of stable, long-lived battery may be used, and any adjustment of battery potentials desirable for the services needed may be utilized without departing from the spirit of my invention and the scope of the appended claims. My system may also be applied to burglar alarms and to any use wherein a source of emergency or standby power is desirable for a given length of time, and wherein said power source is preferably maintained at full efficiency at all times. Where existing fire alarm systems are installed, my invention provides an inexpensive and easy method of adding emergency exit lights without duplication of battery facilities, and provides an increased degree of safety for the public by permitting the installation of such an emergency lighting system in locations where the expense of additional batteries would otherwise prevent it.

The essential novel feature of my invention is the provision of an inexpensive emergency standby electric power system, adapted to function for a definite period of time upon the failure of a main source of supply, here particularly applied to the lighting of exits in places of public assembly, and to maintaining the fire alarm system associated therewith.

I claim:

1. In combination with a main lighting system and main power source, a stand-by battery system having a minimum charge requirement, an emergency lighting system, means for connecting said emergency lighting system to said standby battery upon failure of said main lighting source, means for disconnecting said battery from said emergency lighting system upon approaching said minimum stand-by charge requirement, and means for automatically maintaining said battery at a charge greater than said minimum by an amount sufficient to energize said emergency lighting system for a predetermined period.

2. In combination with a main power supply, an emergency lighting system, an emergency power supply storage battery having a minimum stand-by charge requirement for purposes other than lighting, means for maintaining said battery at a charge greater than said minimum by an amount sufficient to energize said emergency lighting system for a predetermined period of time, means for switching said emergency lighting system on to said battery upon failure of said main power supply, and means for disconnecting said emergency lighting system from said battery when said minimum charge is approached.

3. In combination with a main power supply, an emergency power supply system storage battery having a stand-by minimum charge requirement for purposes other than lighting, emergency lights, means for switching said emergency lights on to said battery upon failure of the main power supply, means for disconnecting a portion of the circuit to said emergency lights from said battery when said minimum charge is approached, means for regulating the charge in said battery to an amount capable of energizing said emergency lighting system for a predetermined time before disconnection from said battery source, and means for reconnecting said disconnected portion of the circuit from said battery to said emergency lights upon restoration of said main supply.

4. In combination with a main load and an emergency load, a main source of electrical energy and an emergency source of electrical energy, means for controlling the energization of said main load by said main source, means operative upon failure of said main source for connecting said emergency source to said emergency load, and means interlinked with said main load energization controlling means for preventing said emergency load connecting means from operating when the said main load has not been energized at the time of failure of said main source.

5. In combination with a main power source and a main load, a stand-by source of direct current power and an emergency lighting system adapted to function by such power, means for controlling the energization of said main load from a main source, means interlocked with such main load energization controlling means for connecting said stand-by power source to said emergency lighting system upon failure of said main source, whereby connection of said standby source to said emergency lighting system is prevented when said main load is not connected to said main source, means for opening a portion of said emergency circuit after a certain period of time, and means for reclosing said opened portion of said emergency circuit upon restoration of said main source.

6. In combination with a main power supply and a main lighting system, an emergency lighting system, an emergency rechargeable battery source having a minimum stand-by charge requirement, means responsive to current failure in said main power supply for connecting said emergency lighting system to said battery source, and means for disconnecting said emergency system from said battery upon approaching said minimum stand-by charge.

7. In combination with a main power supply and a main lighting system, an emergency lighting system, an emergency rechargeable battery source having a minimum stand-by charge requirement, means responsive to current failure in said main power supply for connecting said emergency lighting system to said battery source, and means for disconnecting said emergency system from said battery after the passage of a certain amount of electrical energy therebetween.

8. In combination with a main power supply and a main lighting system, an emergency lighting system, an emergency rechargeable battery source having a minimum stand-by charge requirement, means responsive to current failure in said main power supply for connecting said emergency lighting system to said battery source, and means for breaking said connection after a certain period of time.

9. In combination with a main power supply and a main lighting system, an emergency lighting system, an emergency rechargeable battery source having a minimum stand-by charge requirement and means responsive to current failure in said main power supply for connecting said emergency lighting system to said battery source, means operable to open a portion of the circuit between said battery source and said emergency lighting system when said minimum charge is approached, and means actuated by said main supply for restoring said opened circuit portion.

10. A system as described in claim 6, including mechanically interlocked switching means for simultaneously connecting said main lighting system to said main power supply, and energizing said means responsive to current failure in said main power supply for connecting said emergency lighting system to said battery source.

JOSEPH M. DANNHEISER.